United States Patent [19]
Ellinger

[11] 3,885,379
[45] May 27, 1975

[54] SYSTEM FOR MOUNTING SPINDLE BEARING HOUSINGS

[75] Inventor: Karl Ellinger, Reichenberg, Germany

[73] Assignee: SKF Kugellagerfabriken GmbH, Schweinfurt, Germany

[22] Filed: Oct. 3, 1973

[21] Appl. No.: 403,332

[30] Foreign Application Priority Data
Oct. 14, 1972 Germany............................ 2250472

[52] U.S. Cl. ................................................. 57/132
[51] Int. Cl. ........................... D01h 7/14; D01h 7/22
[58] Field of Search........................ 57/129, 130, 132

[56] References Cited
UNITED STATES PATENTS
2,902,818  9/1959  Schollkopf............................ 57/132
3,447,305  6/1969  Stahlecker et al..................... 57/132

FOREIGN PATENTS OR APPLICATIONS
18,638  2/1909  United Kingdom.................... 57/132

Primary Examiner—Donald E. Watkins
Attorney, Agent, or Firm—Murray Schaffer

[57] ABSTRACT

A spindle bearing housing is provided with an annular groove formed on its outer surface. A bell-shaped flange fits over the spindle and has its widest edge resting on the upper surface of the spindle bank. The flange is provided with an annular collar at its narrower edge which is received within the groove.

8 Claims, 4 Drawing Figures

SYSTEM FOR MOUNTING SPINDLE BEARING HOUSINGS

BACKGROUND OF INVENTION

The present invention relates to a system for mounting bearing housings for spinning and twisting spindles having an attached bell-type flange.

Spindle bearing housings of the present type are disclosed in Swiss Pat. No. 469,831. In this patent the bearing housing is supported on the spindle bank by an elastic securing ring rigidly held in an annular groove formed on the outer surface of the housing. The securing ring rests on a flange which is forced fit about the housing and which in turn rests on the upper surface of the spindle bank. A second securing ring, located in a second annular groove in the surface of the housing, is provided below the spindle bank. In this way the elasticity inherent in the flange, in the axial direction, is utilized to attach the housing to the spindle bank. Only in the state of being so attached is there a rigid connection between the housing and the flange which are otherwise individual separate parts. These parts are interlocked only when the housing is to be attached to the spindle bank. With this arrangement it is essential to match the axial spacing between the two housing grooves to the thickness of the spindle bank, to the height of the flange and to its axial elasticity. The attachment of the housing in the spindle bank is therefore complicated by the necessity for precisely manufacturing several components. The assembly furthermore is clumsy and complicated and special assembly measures must be undertaken to insure proper assembly.

It is also known to provide flanges in the form of annular discs made separately from the spindle bearing housing and then later connected rigidly with the housing. In an arrangement of this kind, disclosed in German Pat. No. 1,021,771, a snap ring forming the flange is inserted in an annular groove in the housing. The snap ring is provided with an annular collar into which a belleville spring is sprung to provide a resilient means between the flange and the spindle bank. This belleville spring supports the housing on the spindle bank. Here again multiple components are provided and all the parts must be accurately machined and dimensioned so as to match one another.

It has been still further known to provide a housing flange stamped from sheet steel metal which can be pressed onto a conical jacket or onto a cylindrical jacket fitted over the housing. The flange is slid on the jacket until it abuts and rests against a collar and is securely held there by a sleeve subsequently slid over the jacket. The edge of the sleeve and the adjacent housing facing away from the flange is knurled or beaded. In the event a conical connection is employed, accurate dimensional fitting and corresponding perfect machining of the housing, and the flange are needed. Further, in both the conical and cylindrical forms, the three part connection calls for carefully dimensioned machining of all of the parts.

A process for attaching flanges to spindle bearing housings is also known from the German Pat. publication No. 1,560,283 in which an annular flange is arranged loosely about the housing. The flange and housing are then heated via an electro welding device and compressed in such a way that material flows into the recess between it and the housing. After the assembly is cooled the material shrinks and a seat is produced between the flange and housing.

Finally, it is known from German Pat. No. 377,190 to provide a peripheral annular groove in the housing surface and by an extrusion process to provide a flat type flange which is held rigidly in the groove. The groove is provided with knurling or splining to hold the flange.

In those cases where a rigid joint or connection is made between the flange and the housing prior to the insertion of the housing in the spindle bank, the flanges are flat and lie flush on the surface of the spindle bank. The nature of the attachment of these flanges to the housing calls for intermediate members or dimensionally precise machining of the flange and of the housing, or relatively expensive processes in order to insure accurate assembly.

A further problem arises providing the spindle and spindle bearing housing with a whorl-hook which is adapted to hold the spindle onto the spindle bearing. In all of the aforementioned cases additional special forms and machining is requiring to hold the whorl on the housing.

It is an object of the present invention to provide an improved system for mounting spindle bearing housings to a spindle frame which overcome the defects and disadvantages of the prior art.

It is a further object of the present invention to provide a spindle bearing housing with a flange fitted rigidly to it where complicated and accurate machining is not needed for either the flange or for the housing.

It is a further object of the present invention to provide a spindle bearing housing with a flange which may be directly joined to it in a rigid connection within a less complicated manner than known in the prior art.

It is a further object of the present invention to provide a spindle bearing housing and flange for mounting the same on a spindle bank which is provided with more favorable means for mounting the whorl-hook holding the spindle against axial movement from the spindle bearing.

These objects, other objects, and other advantages will be apparent from the following description of the preferred form of the present invention.

SUMMARY OF INVENTION

According to the present invention a system for mounting a spindle bearing housing to a spindle bank is provided. The spindle bearing housing is provided with an annular groove formed in its outer surface. A bell shaped flange fits over the spindle and has its widest edges resting on the spindle bank. The bell shaped flange is provided with an annular collar as its other end which collar is adapted to be beaded so as to be received within the groove formed on the housing. The spindle bearing housing is secured below the spindle bank by the use of a conventional threaded nut which axially tightens the bell shaped flange and stresses the same within the annular groove of the spindle housing.

Preferably the groove is in the surface of the bearing housing is provided with a lower and upper annular surface portions. The lower surface portion extending in an inwardly conical taper while the upper surface portion extends outwardly therefrom at a very sharp or acute angle. Further, one of the upper or lower surfaces is preferably knurled or otherwise worked so as to prevent rotation of the spindle bearing housing with respect to the flange.

A whorl-hook is attached to the flange so as to extend upwardly into cooperation with the spindle so as to hold the spindle onto the spindle bearing.

Full details of the present invention follow herein and will be seen in the accompanying drawings.

DESCRIPTION OF INVENTION

Figure 1:
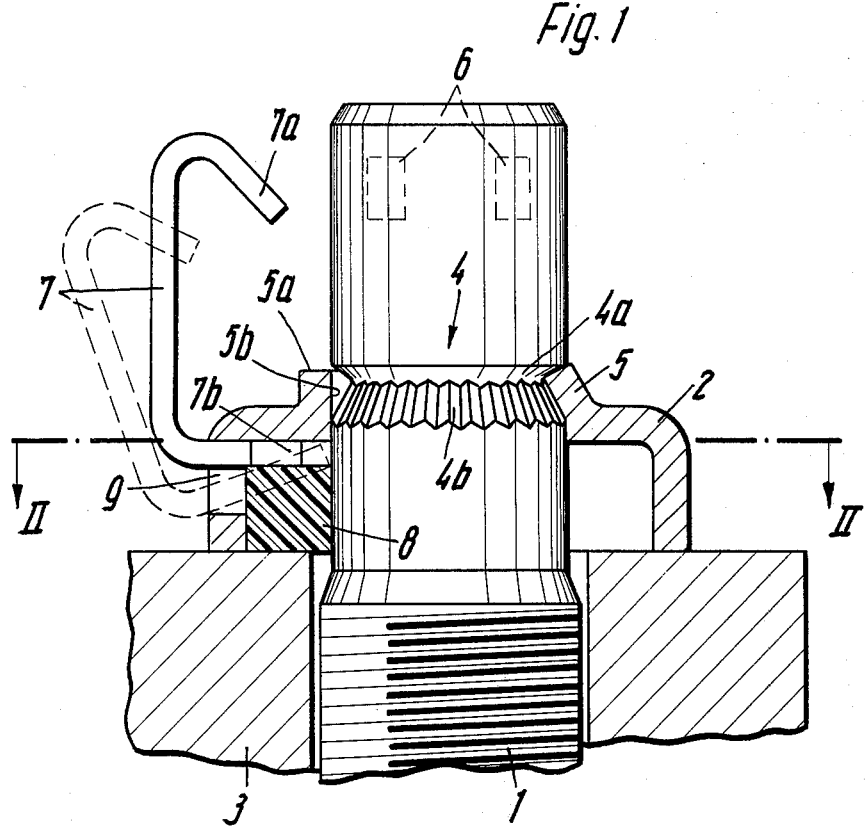
FIG. 1 is a side view in partial section of the upper portion of the spindle bearing housing showing the application of the present invention.
Figure 2:
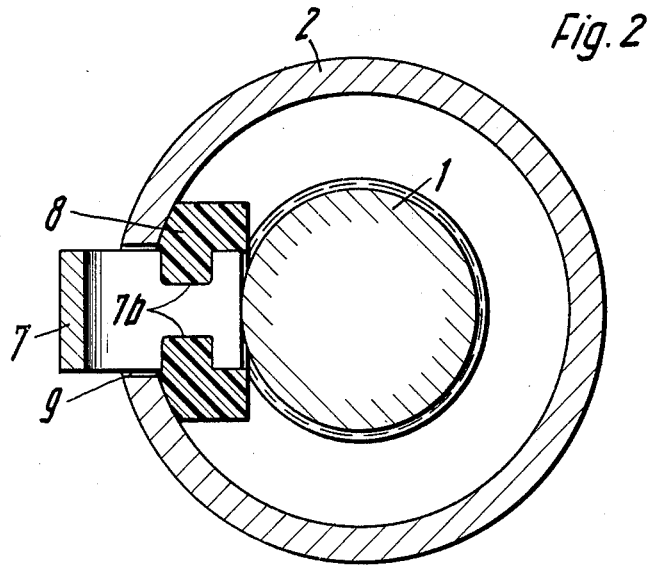
FIG. 2 is a sectional view taken from above along the line 2—2 of FIG. 1.
Figure 3:
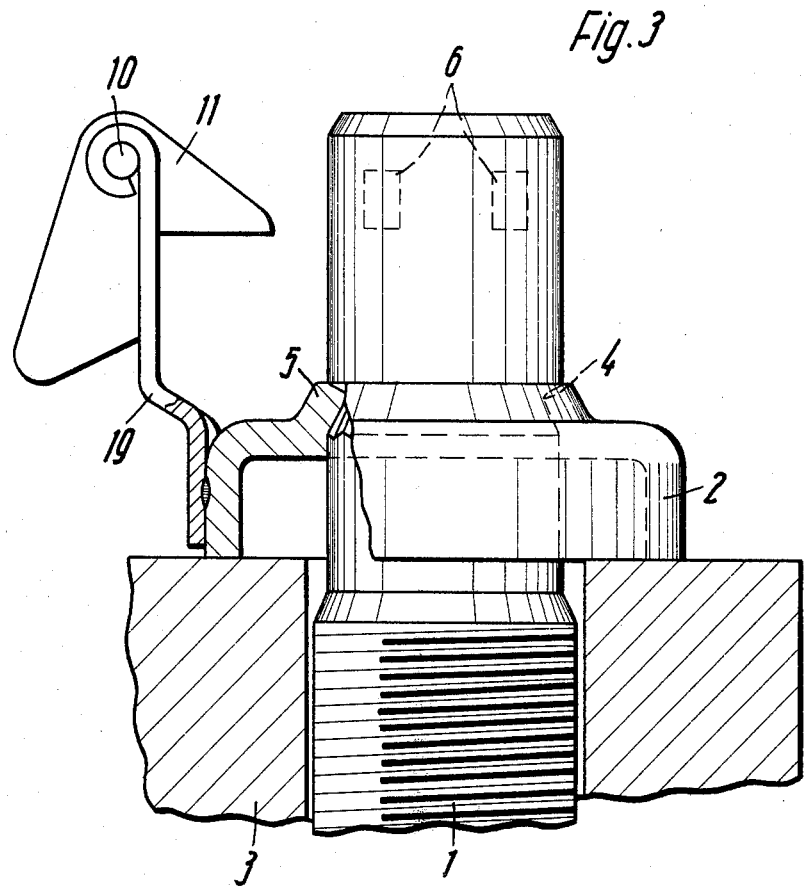
FIG. 3 is a view similar to that of FIG. 1 showing a second form of whorl-hook to the present invention.
Figure 4:
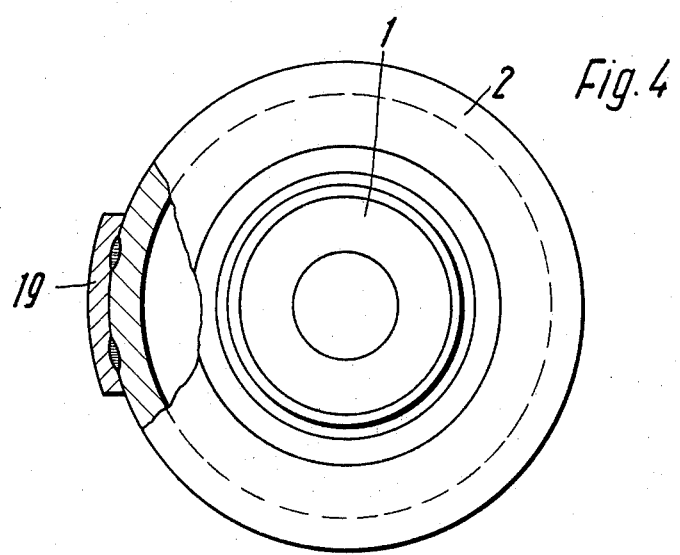
FIG. 4 is a view similar to that of FIG. 2 showing the embodiment of FIg. 3.

The system for mounting the spindle bearing is the same in all four figures, the embodiments of FIGS. 1 and 2 differing from that of FIGS. 3 and 4 only in the provision of a different whorl-hook.

In the Figures the spindle bearing housing 1 is supported by a flange 2, formed in accordance with the present invention, on a spindle bank 3 which is only partially shown. The spindle bank 3 is attached to the frame of the machine in the usual manner. The spindle bearing housing, in addition to the novel flange 2, which will be described in greater detail later, is secured to the spindle bank 3 by means arranged below the spindle bank. These means are conventional in nature and not shown in detail in the drawings. Such means may include a nut screwed onto the threaded outer surface of the lower portion of the housing. This nut is tightened against the lower surface of the spindle bank causing the spindle bearing housing to be axially drawn downward forcing the flange 2 to rest rigidly on the upper surface of the spindle bank. The upper end of the spindle bearing housing is provided with a neck bearing 6, which receives the spindle for twisting the yarn or thread. The neck bearing is a conventional anti-friction bearing and thus need not be illustrated any further herein.

As may be seen clearly from FIGS. 1 and 3, the novel flange 2 comprises a bell shaped member having its wide end resting on the upper surface of the spindle bank. The bell shaped flange 2 is made separately from the housing 1 and is slipped over the spindle bearing housing during the assembly of the housing onto the spindle bank. For this purpose the spindle bearing housing 1 is provided with a circular or annular groove 4 on its outer surface having two surface portions 4a and 4b. The surfaces 4a and 4b run conically in relationship to the central axis of the housing 1 and meet one another generally in an inclination of about 90 degrees within the lowermost depth of the groove. The lower surface portion 4b is tapered inwardly at less of an inclination than the upper surface 4a and is provided with knurling in the form of uniformly spaced ribs, and/or splines or the like.

The bell shaped flange 2 is made preferably from sheet metal material or other highly workable material. Preferably the flange can be deep drawn or press molded from cylindrical stock, so as to simultaneously provide its bell shaped form with its wide end and a smaller end in the form of a cylindrical collar 5. The inner diameter of the cylindrical collar 5 is substantially equal to the outer diameter of the spindle bearing housing about which it is to be fitted. The depth of the flange need not be precisely determined, however it should match the distance between the spindle bank surface and the level of the groove 4. This may of course be adjusted by the positioning of the nut on the lower surface of the spindle bank. After the flange 2 is slipped over the housing 1, the flange 2 is rigidly mechanically joined to the spindle bearing housing by turning the collar 5 inwardly into the groove 4 as seen on the right side of FIG. 1 and in FIG. 3. The collar 5 is turned inwardly so that it has a wall portion 5a which conforms to and rests on the surface portion 4a of the groove 4. Simultaneously it has a lower wall portion 5b which conforms to and rests on the knurled portion 4b of the groove 4. In this way a reliable non-rotatable direct connection is obtained between the flange 2 and the bearing housing 1 suitable to absorb all mechanical stresses during the working of the spindle. Because of the resilient nature of the bell shaped flange created by both its shape and the material used, the tightening of the not shown nut on the lower portion of the bearing housing drawing the spindle bearing downwardly exerts a force and pressure on the flange 2 which securely locks the flange between the groove 4 and the upper surface of the spindle bank 3. As noticed resilient cushioning means or securing ring need not be provided between the flange 2 and the upper surface of the spindle bank 3.

The bell shape of the flange 2 enables the spindle bearing housing to be easily provided with a whorl-hook. FIGS. 1 and 2 so show a whorl-hook 7 which in itself comprises a rigid member which comprises a bent upper end 7a adapted to engage the collar of a not shown spindle when inserted on the spindle bearing 6. The lower end of the hook 7 extends radially through a hole in the side wall of the flange 2. The lower end is secured in the cavity of the flange 2 by a constriction or neck portion 7b (see FIG. 2) which end 7b rests in a conformingly shaped cut out or recessed portion formed in an elastic block 8 located within the interior of the flange. The elastic block 8 is formed of a resilient material such as rubber or plastic and is secured within the cavity of the flange 2 by either bonding the same to the walls thereof or wedging the same between the wall and the spindle housing and spindle bank when the flange 2 is resiliently compressed in position. The block 8 has a shape and a dimension such that on being inserted into the cavity of the flange 2 it is slightly deformed and thereby rests resiliently or elastically with adequate securing force so as not to drop out, between the flange 2 and the bearing housing 1. The block 8 is furthermore dimensioned in such a way that in the fully installed position it holds the end of the hook 7 so that the hook rests on the inner surface of the upper shoulder of the flange 2 and the hook 7 extends upright as indicated in the full lines of FIG. 1. In this condition the block 8 is slightly compressed against the spindle bank 3 exerting a compressive force on the lower radial portion of the hook 7. During the assembly of the spindle bearing housing or when the spindle bearing housing is loosened with respect to the spindle bank 3, the whorl-hook 7 is somewhat loosened and becomes tipped into its released position as indicated by the dotted lines in FIG. 1. In this manner the collar of the spindle may be released. At the same time the block 8 remains somewhat compressed and supported on the spindle bank 3 and the hook 7 is not fully released.

In FIGS. 3 and 4 the bell shaped flange 2, which is here shown in the state entirely flanged and connected with the housing 1, is provided with a rigidly welded support 19 on which is mounted a spindle locking pawl 11 which is pivotable about a bearing 10. This pawl and bearing arrangement is a well known type of locking and release mechanism for spindles mounted on a bearing housing 1 of general design. The bell shape of the flange 2 permits the welding of the supporting arm 19 in a particularly favorable manner and avoids the need for welding this member onto the spindle bank itself or without any special reshaping of the flange or removal of stock material from the flange in order to facilitate such mounting.

It will thus be observed from the foregoing that a simple and easily adaptable flange mounting system is provided for the spindle bearing housing. This system is easily obtained and subject to modification and changes as herein disclosed and as will be obvious to those skilled in the art. Further, the present invention provides a more suitable means for mounting the spindle whorl-hook adapted to hold the spindle. The present disclosure is therefore to be taken as illustrative only of the present invention and not as limiting of its scope.

What is claimed is:

1. A system for mounting a spindle bearing housing to a spindle bank comprising a tapered annular groove formed within the outer surface of said housing, a bell shaped flange adapted to rest on said spindle bank and to surround said housing, said flange having a collar adapted to be beaded and inserted within said groove, said beaded collar conforming to the taper and inclination of said annular groove.

2. The system according to claim 1 wherein the groove is formed with a lower and upper annular surface portion each extending conically with respect to the longitudinal central axis of the housing and being inclined with respect to one another at an angle of approximately 90°.

3. The system according to claim 2 wherein in at least one of said surface portions is knurled.

4. The system according to claim 1, including a whorl-hook carried in the cavity of said bell shaped flange protruding outwardly through a hole in the side wall thereof upwardly adjacent said housing, said whorl-hook being adapted to engage the spindle mounted therein.

5. The system according to claim 4 wherein a resilient cushioning block secures said whorl-hook within said flange.

6. The system according to claim 1, including a whorl-hook carried by said flange, said hook having a pivotable locking pawl engageable with a spindle mounted on said spindle bearing housing.

7. The system according to claim 6 wherein said locking pawl is carried at the end of a vertical member welded to the outer surface of said flange and extending adjacent to said bearing housing.

8. The system according to claim 5 including means for axially positioning said spindle bearing housing with respect to said spindle bank thereby compressing said block and exerting a resilient force on the bell shaped flange and said whorl-hook.

* * * * *